US011119049B2

(12) United States Patent
Keinan

(10) Patent No.: US 11,119,049 B2
(45) Date of Patent: Sep. 14, 2021

(54) PARTICLES IN LIQUID DETECTION METHOD AND PARTICLES IN LIQUID DETECTION SYSTEM AND METHOD TO DETECT PARTICLES IN THE AIR

(71) Applicant: Fluidsens International Inc., Washington Township, NJ (US)

(72) Inventor: Alex Keinan, Rishon Le-Zion (IL)

(73) Assignee: FLUIDSENS INTERNATIONAL INC., Washington Township, NJ (US)

( * ) Notice: Subject to any disclaimer, the term of this patent is extended or adjusted under 35 U.S.C. 154(b) by 328 days.

(21) Appl. No.: 15/745,438

(22) PCT Filed: Jul. 21, 2016

(86) PCT No.: PCT/IL2016/050792
§ 371 (c)(1),
(2) Date: Jan. 17, 2018

(87) PCT Pub. No.: WO2017/013653
PCT Pub. Date: Jan. 26, 2017

(65) Prior Publication Data
US 2018/0217070 A1 Aug. 2, 2018

(51) Int. Cl.
*G01N 21/85* (2006.01)
*G01N 1/14* (2006.01)
(Continued)

(52) U.S. Cl.
CPC ............ *G01N 21/85* (2013.01); *G01N 1/14* (2013.01); *G01N 1/18* (2013.01); *G01N 1/2035* (2013.01);
(Continued)

(58) Field of Classification Search
CPC ........ G01N 21/85; G01N 21/05; G01N 21/31; G01N 21/35; G01N 21/33; G01N 1/14;
(Continued)

(56) References Cited

U.S. PATENT DOCUMENTS 1,505,669 A * 8/1924 Quain .................... C01B 13/11
422/186.07
2,240,668 A * 5/1941 Reed ......................... C01B 7/03
423/394
(Continued)

FOREIGN PATENT DOCUMENTS

CN 104020736 9/2014
JP 7-209180 8/1995
(Continued)

OTHER PUBLICATIONS

Written opinion of the international search authority of PCT/IL2016/050792 dated Nov. 16, 2016.

*Primary Examiner* — Blake C Riddick
(74) *Attorney, Agent, or Firm* — Reches Patents

(57) ABSTRACT

A method and system for detecting foreign particles in a liquid, the method and system include transmitting transmitted pulses of radiation, by a transmitter, towards a liquid conduit that is filled with liquid; wherein the transmitted pulses comprises pulses that differ from each by being associated with absorbance frequencies of different foreign particles; receiving, by a receiver, received pulses that propagated through liquid as a result of the transmission of the multiple transmitted pulses; comparing between the transmitted pulses and the received pulses to provide a comparison result; and determining a liquid contamination based on the comparison result.

47 Claims, 11 Drawing Sheets

(51) Int. Cl.
    *G01N 1/18*      (2006.01)
    *G01N 1/20*      (2006.01)
    *G01N 15/06*     (2006.01)
    *G01N 21/31*     (2006.01)
    *G01N 21/05*     (2006.01)
    *G01N 21/35*     (2014.01)
    *G01N 21/33*     (2006.01)
    *G01N 1/10*      (2006.01)

(52) U.S. Cl.
    CPC ............. *G01N 15/06* (2013.01); *G01N 21/05* (2013.01); *G01N 21/31* (2013.01); *G01N 21/35* (2013.01); *G01N 21/33* (2013.01); *G01N 2001/1006* (2013.01); *G01N 2001/205* (2013.01); *G01N 2015/0693* (2013.01)

(58) Field of Classification Search
    CPC ........ G01N 1/18; G01N 1/2035; G01N 15/06; G01N 2001/1006; G01N 2001/205; G01N 2015/0693
    USPC ................................................ 250/372, 373
    See application file for complete search history.

(56) References Cited

U.S. PATENT DOCUMENTS

| | | | | |
|---|---|---|---|---|
| 3,013,953 | A * | 12/1961 | Frazer | C07C 17/38 203/49 |
| 3,139,361 | A * | 6/1964 | Rasmanis | C30B 25/18 117/95 |
| 3,740,143 | A * | 6/1973 | Groner | G01N 1/31 356/39 |
| 3,859,787 | A * | 1/1975 | Anderson | F02C 7/12 60/737 |
| 3,917,945 | A * | 11/1975 | Sema | G01N 21/64 250/301 |
| 3,976,862 | A | 8/1976 | Curbelo | |
| 3,982,540 | A * | 9/1976 | Ross | A61M 1/0058 604/540 |
| 4,003,661 | A * | 1/1977 | Yamano | G01N 21/534 356/436 |
| 4,057,721 | A * | 11/1977 | deVial | G01N 21/64 250/301 |
| 4,176,963 | A | 12/1979 | Fabinski | |
| 4,274,745 | A * | 6/1981 | Takahashi | G01N 21/9027 250/574 |
| 4,674,879 | A * | 6/1987 | Gregorig | G01N 21/532 356/301 |
| 4,898,462 | A * | 2/1990 | Numata | G01N 21/27 250/573 |
| 4,900,152 | A * | 2/1990 | Wiegleb | G01N 21/85 250/576 |
| 4,931,660 | A * | 6/1990 | Mayer | G01N 21/85 250/575 |
| 5,155,367 | A * | 10/1992 | Han | G01N 21/94 250/215 |
| 5,225,333 | A * | 7/1993 | Krause | C12Q 1/025 250/458.1 |
| 5,227,636 | A * | 7/1993 | Schwiesow | G01N 21/33 250/345 |
| 5,269,832 | A | 12/1993 | Meijer | |
| 5,272,345 | A | 12/1993 | Durham et al. | |
| 5,405,014 | A * | 4/1995 | Krieg | B07C 5/3408 209/524 |
| 5,408,326 | A | 4/1995 | Wang | |
| 5,418,614 | A * | 5/1995 | Brost | G01N 21/8507 250/227.23 |
| 5,420,432 | A * | 5/1995 | Manook | G01N 1/14 250/373 |
| 5,422,495 | A * | 6/1995 | Cohn | G01N 21/431 250/227.14 |
| 5,438,420 | A * | 8/1995 | Harwick | G01N 21/534 356/440 |
| 5,460,792 | A * | 10/1995 | Rosenbaum | A62D 3/38 423/245.3 |
| 5,474,748 | A * | 12/1995 | Szabo | A61L 2/10 250/436 |
| 5,509,375 | A * | 4/1996 | Sayka | B05B 12/004 118/320 |
| 5,619,333 | A * | 4/1997 | Staff | G01N 21/534 356/335 |
| 5,742,064 | A * | 4/1998 | Infante | G01N 21/8507 250/339.12 |
| 5,777,726 | A * | 7/1998 | Krone-Schmidt | G01N 21/552 356/38 |
| 5,807,750 | A * | 9/1998 | Baum | G01N 21/31 250/341.1 |
| 6,043,505 | A * | 3/2000 | Ames | G01N 21/534 250/225 |
| 6,331,704 | B1 * | 12/2001 | Owen | G01N 15/0205 250/227.22 |
| 6,617,591 | B1 * | 9/2003 | Simonson | G01N 21/643 250/459.1 |
| 6,786,096 | B2 * | 9/2004 | Bond | G01N 21/59 73/598 |
| 6,916,492 | B2 * | 7/2005 | Goswami | C09B 61/00 424/520 |
| 7,391,557 | B1 * | 6/2008 | Bruch | G01J 3/10 356/450 |
| 7,518,719 | B2 * | 4/2009 | Sprenger | G01N 15/06 356/243.2 |
| 2002/0050567 | A1 | 5/2002 | Boudet | |
| 2002/0171054 | A1 * | 11/2002 | Yamazaki | G01N 21/9027 250/559.45 |
| 2003/0058450 | A1 * | 3/2003 | Mosley | G01N 21/3151 356/436 |
| 2003/0098409 | A1 * | 5/2003 | Bond | G01N 21/59 250/223 R |
| 2003/0098969 | A1 | 5/2003 | Katz | |
| 2003/0117623 | A1 * | 6/2003 | Tokhtuev | G01N 21/53 356/338 |
| 2004/0252305 | A1 * | 12/2004 | Schackel | G01J 1/04 356/432 |
| 2005/0052645 | A1 * | 3/2005 | Stewart | G01N 21/31 356/301 |
| 2006/0008560 | A1 * | 1/2006 | Naganuma | B07C 5/342 426/489 |
| 2006/0263896 | A1 * | 11/2006 | Hollebone | G01N 21/0303 436/165 |
| 2007/0013910 | A1 * | 1/2007 | Jiang | G01N 15/0205 356/336 |
| 2007/0104849 | A1 * | 5/2007 | McClements | A23L 2/385 426/590 |
| 2008/0218738 | A1 * | 9/2008 | Trainer | G01B 11/08 356/72 |
| 2009/0020016 | A1 * | 1/2009 | Christophersen | A01K 1/0047 96/224 |
| 2009/0116005 | A1 | 5/2009 | Furuki | |
| 2009/0195761 | A1 * | 8/2009 | De Graaf | G03F 7/70341 355/30 |
| 2010/0133200 | A1 * | 6/2010 | Gin | G01N 21/05 210/742 |
| 2010/0231909 | A1 * | 9/2010 | Trainer | G01B 11/08 356/336 |
| 2011/0009745 | A1 * | 1/2011 | Seifer | G01F 1/74 600/437 |
| 2011/0083261 | A1 | 4/2011 | Goergen | |
| 2011/0102790 | A1 * | 5/2011 | Haught | G01J 3/02 356/319 |
| 2011/0159596 | A1 * | 6/2011 | Keinan | G01N 1/2211 436/52 |
| 2011/0242538 | A1 * | 10/2011 | Palmskog | G01N 21/314 356/433 |
| 2011/0246100 | A1 * | 10/2011 | Carvalho | G01F 23/284 702/50 |
| 2011/0259832 | A1 * | 10/2011 | Castillo Rivera | C02F 1/32 210/745 |
| 2013/0015362 | A1 | 1/2013 | Hooper et al. | |

(56) References Cited

U.S. PATENT DOCUMENTS

| | | | |
|---|---|---|---|
| 2013/0161613 A1* | 6/2013 | Nakamura | H01L 31/0256 257/43 |
| 2013/0340518 A1* | 12/2013 | Jones | E21B 49/005 73/152.55 |
| 2015/0021482 A1* | 1/2015 | Muller | G01N 15/0205 250/341.1 |
| 2015/0049335 A1 | 2/2015 | Maselli | |
| 2015/0323420 A1* | 11/2015 | Kuznia | G01M 11/3145 356/73.1 |
| 2018/0216331 A1* | 8/2018 | Ku | E03D 9/02 |
| 2018/0217053 A1 | 8/2018 | Deguchi | |

FOREIGN PATENT DOCUMENTS

| | | |
|---|---|---|
| JP | 2003057230 | 2/2003 |
| JP | 2007301953 | 11/2007 |
| JP | 2009517641 | 4/2009 |
| JP | 2009150666 | 7/2009 |
| KR | 20120098155 | 9/2012 |
| WO | 2007121864 | 11/2007 |
| WO | 2013143859 | 10/2013 |

\* cited by examiner

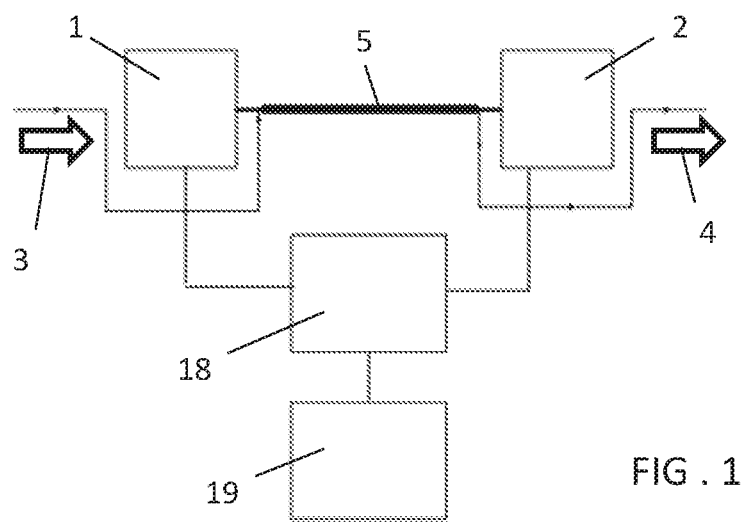
FIG. 1
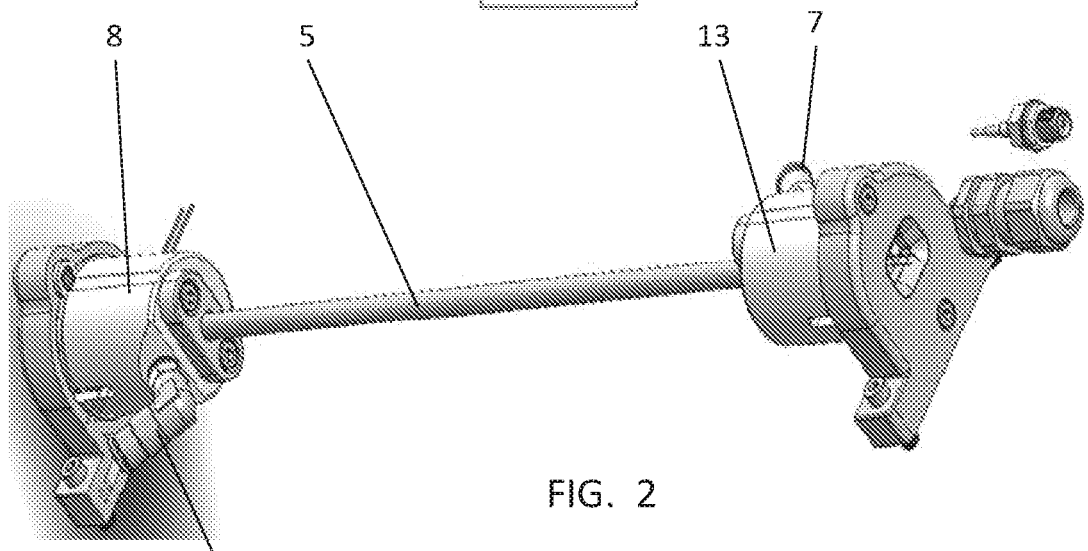
FIG. 2
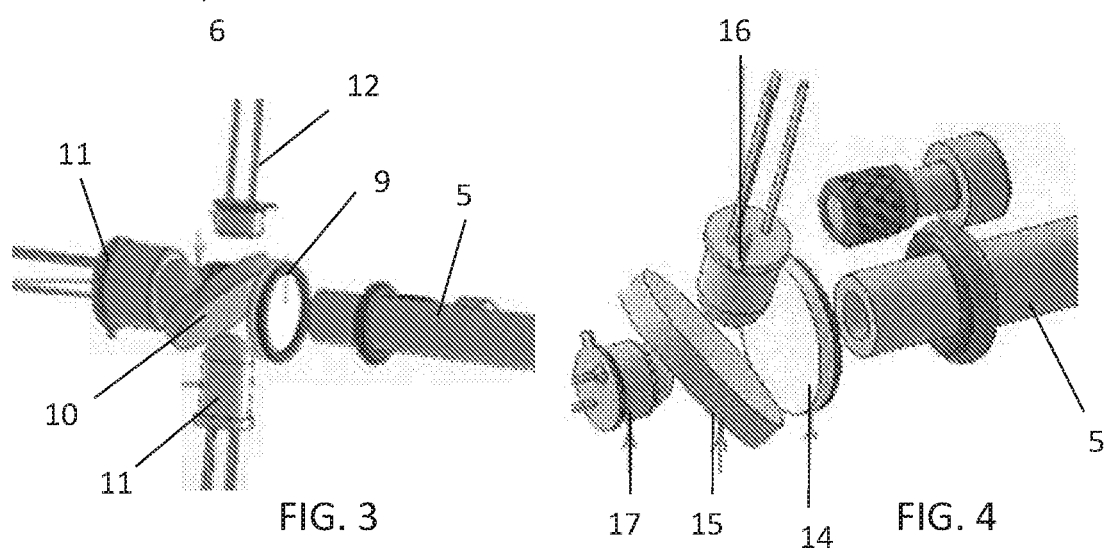
FIG. 3
FIG. 4

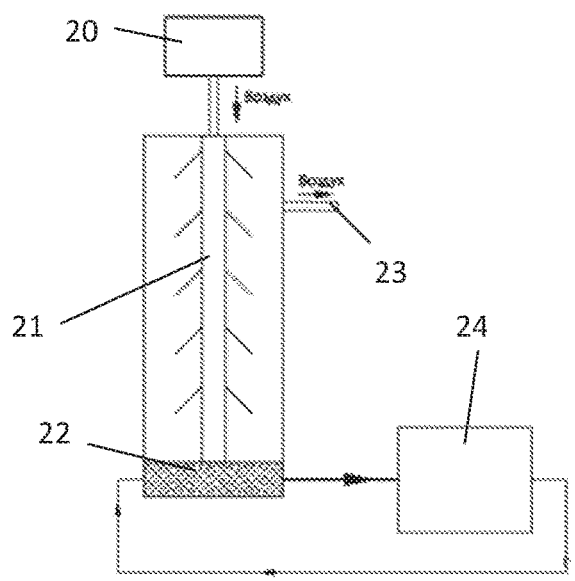
FIG. 5
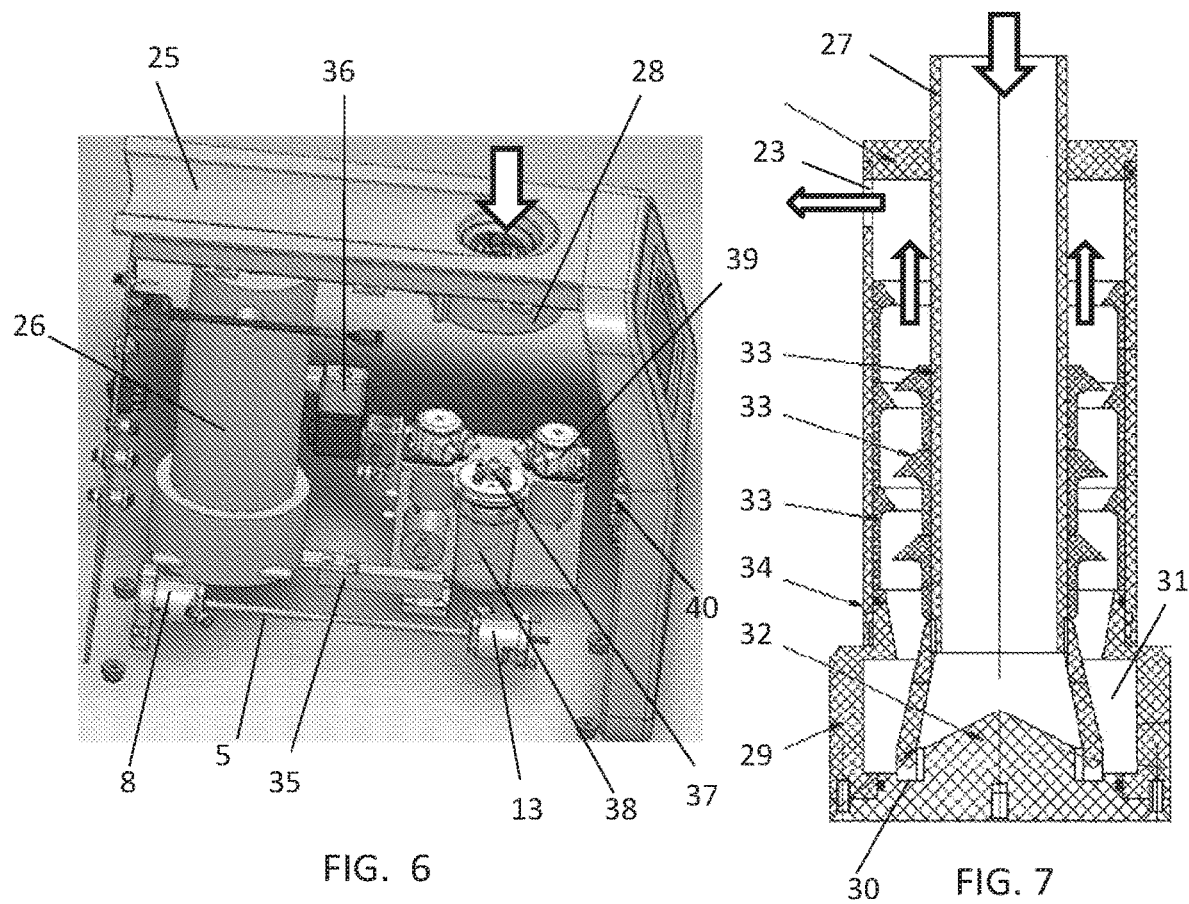
FIG. 6
FIG. 7

PARTICLES IN LIQUID DETECTION METHOD AND PARTICLES IN LIQUID DETECTION SYSTEM AND METHOD TO DETECT PARTICLES IN THE AIR

RELATED APPLICATION

This patent application claims priority from Russian patent application serial number 046217 filing date 21 Jul. 2015, which is incorporated herein in its entirety.

FIELD OF THE INVENTION

The invention refers to measuring equipment field. In particular new method and instrument design for water and air quality monitoring are subject to consideration. Method and design of the instrument allows communicating air and watering pollution data to control center in few seconds identifying contamination location.

BACKGROUND

Water clarity and turbidity depends on suspended mechanical impurities content. The more admixtures in the water, the higher turbidity and less clarity water features. Transparency is defined by path length of the beam penetrating deep into the water and depends on beam wave length. Ultraviolet beams are easily passing through water and infrared ones—poorly. Clearing index is used to assess water quality and impurities content.

Due to human impact natural water is subject to contamination with various substances deteriorating its quality. Water quality is understood as an aggregate of physical, chemical, biological and bacteriological qualities. Pollutions to water medium vary these qualities.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates a foreign particle detection system (system) and a liquid conduit according to an embodiment of the invention;

FIG. 2 illustrates a receiver and a transmitter and a fluid conduit according to an embodiment of the invention;

FIG. 3 illustrates a transmitter according to an embodiment of the invention;

FIG. 4 illustrates a receiver according to an embodiment of the invention;

FIG. 5 illustrates a system that includes a bubble flask according to an embodiment of the invention;

FIG. 6 illustrates a bubble flask according to an embodiment of the invention;

FIG. 7 illustrates a bubble flask according to an embodiment of the invention;

DETAILED DESCRIPTION OF THE DRAWINGS

Figure 8:
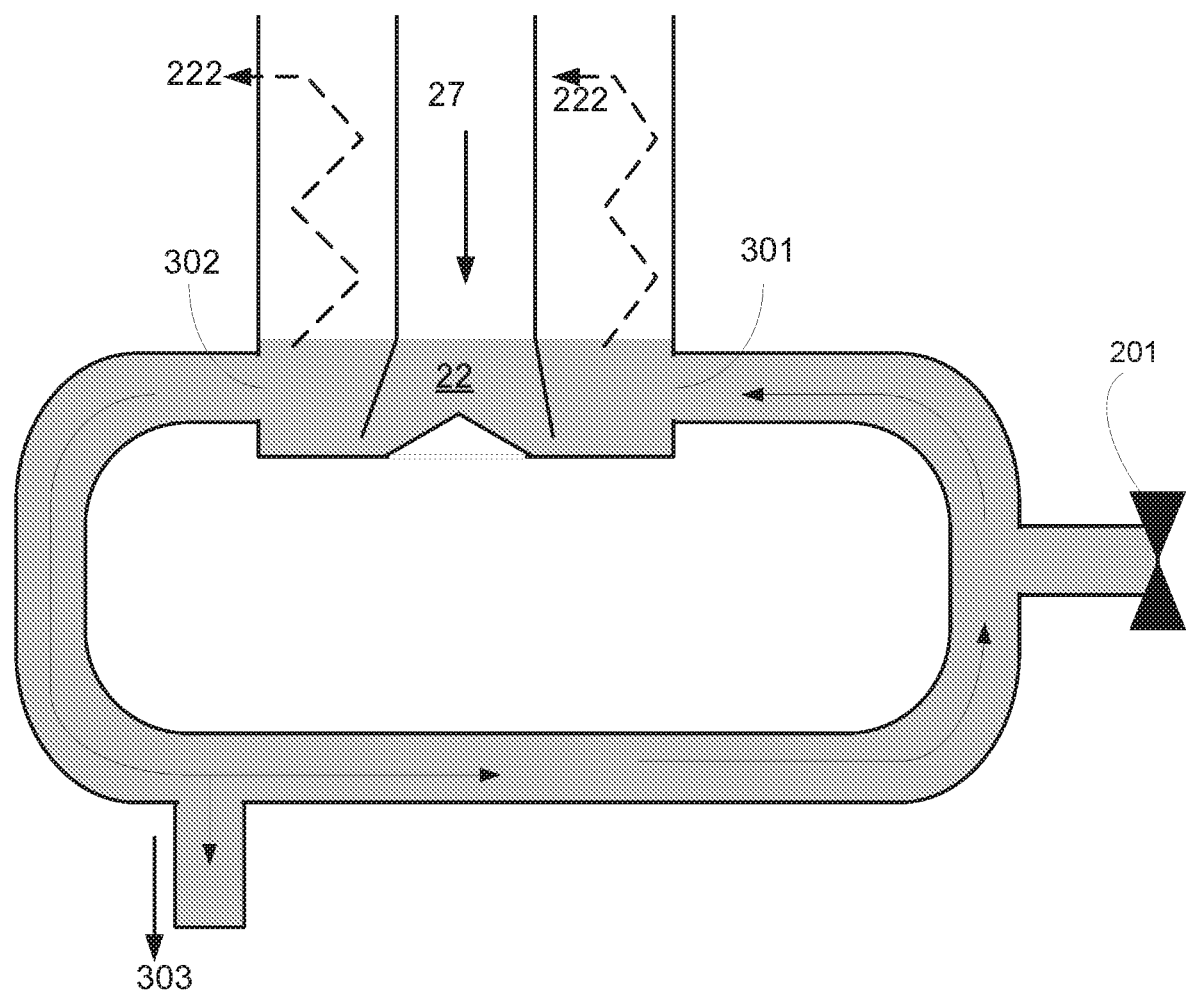
FIG. 8 illustrates a system according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Remote sensing methods shall solve contamination detection issue meaning contamination fact finding. All remote sensing methods are based on difference in electrical or optical properties of pure water and oil-cut water. The following techniques can be referred to remote methods: photographic method; passive method based on direct and water surface reflected diffuse solar radiation registration; method based on fluorescence spectra registration induced by impurities exposure to powerful UV radiation source; radiometric method and radio-reflection method.

One more method is available based on direct and direct and water surface reflected diffuse solar radiation recording by aircraft equipment set. Spectral radiometer or differential radiometer is used as logging unit. When using the last one either difference in radiation intensity of two wavelength intervals or intensity difference of two orthogonal constituent parts of reflected radiation is recorded. Maximum contrast has been received in <0,4 and >0,6 μm. Its weakness is in strong dependence on meteorological conditions: impurities detection is possible at totally overcast sky only (in the absence of direct solar radiation), along with dependence from sun altitude angle above horizon.

To assess treated water on-site and in flow-through mode, water quality monitoring devices using optical methods have gained widespread use, meaning based on water clarity principle. However "clarity" can give only generalized picture of process mode regularity or abnormality, but it does not allow quantifying impurities in the water. Besides that such devices are operable only limited time due to fast contamination of glass surfaces, and quite often periodic cleaning of such surfaces is impossible with analyzed water flowing through.

As a rule, contact type in-flow turbidity meters are optic turbidity meters or haze meters [Andryeyev V.S., Popechitelev Ye.P. Laboratory instruments to explore liquid fluids.—L: Mashinostroyeniye.—1981.—pages 99-101]. Their general lack is contamination of transmitter's and receiver's transparent windows being in direct contact with controlled medium causing very high inaccuracy of measurements, or even instrument's malfunction. There are a number of ways to minimize this factor for example glass heating, glass coating with water-proofing agents, mechanical collectors use, variable thickness working layer measuring cells use, etc. (Belyakov V.L. Oil and water field treatment automation.—M.: Nedra—1988.—page 133). All of them are rather complicated and of low efficiency.

One of effective ways to eliminate windows contamination is to use four-beam circuit providing for two transmitters and two photoelectric receivers. The device operating as per such circuit (GB 2251682, G01N21/49, 21/59, published 15 Jul. 1992], contains measurement chamber with controlled liquid, the walls of which have two transmitters and two photoelectric receivers, where first photoelectric receiver's axis consists with axis of the first transmitter being opposite to it and is perpendicular to the axis of second transmitter, and second photoelectric receiver's axis consists with axis of the second transmitter being opposite to it and is perpendicular to the axis of the first transmitter. Transmitters' and photoelectric receivers' outputs are connected to signal control and processing circuit. Alternative activation of transmitters allows to get two signals from each photoelectric receiver, one of which corresponds to direct attenuated radiation (turbidimetry), and the second one—scattered radiation (nephelometry). Four signals received shall be put into special math expression calculation of which allows getting final result free from clarity instability of each window. However under severe contaminations especially in the presence of sticky phase such device becomes unfit for service.

Various non-contacting haze-meters are available with air gap between optical components and liquid medium. They are normally based on design providing free surface of permanently flowing constant level liquid over which transmitting source is installed. Photoelectric receiver is installed either over same surface of liquid or perpendicular to outflowing jet. Normally output signal of photoelectric receiver is proportional to suspended solids concentration.

For example WTM500 turbidity meter of Sigrist Photometer AG (Switzerland) make [Rogner A. Turbidity Measurement in drinking water applications—new requirements and approaches//International Environmental Technology.—Vol. 8, 6.—1998.—Pp. 9-10] includes topside open major vessel with branch pipe in the bottom side portion to supply fluid and opening in the bottom to create free-falling even stream, collecting tank to remove liquid running over the top of the major vessel and discharging as falling jet, transmitter located over liquid surface and sending light flux through falling jet next to which photoelectric receiver is installed with the axis perpendicular to jet direction. Transmitter and photoelectric receiver outputs are connected to control and signal processing circuit.

The device is featured with the following disadvantages: complexity to maintain uniform cross section of the jet in severe contamination conditions when outlet opening gradually becomes contracted with deposits, along with photoelectric receiver or transmitter dimming and spattering possibility causing inaccuracy of measurement.

Contactless in-flow turbidity meter is also available. Instrument consists of topside open major vessel with branch pipe in the bottom side portion to supply fluid, collecting tank to dispose liquid running over the top of the major vessel, transmitter and photoelectric receiver located over liquid surface. Major vessel is arranged vertically, second transmitter and second photoelectric receiver are also placed over liquid surface, transmitters' and photoelectric receivers' axes are parallel and vertical, they are coplanar, transmitters' axes are faced to major vessel's walls and photoelectric receivers' axes—to the center of the vessel. First transmitter and photoelectric receiver are divided with vertical opaque baffle with horizontal slot being in the liquid in proximity to its surface, and bottom edge folded to vessel's center and not contacting major vessel bottom. Second transmitter and photoelectric receiver are located symmetrically to the first ones with respect to vessel axis and are also divided with similar baffle, outputs of all transmitters and photoelectric receivers are connected to control and signals processing circuit (RU 2235310, G01N21/49, published 27 Aug. 2004). It was accepted as a prototype.

Same source describes continuous water monitoring, emulsion and suspensions concentration measurements with optical method. It was accepted as prototype of the claimed method.

In compliance with this method controlled liquid flows continuously to the major vessel through piping. Liquid goes up along mid and both side walls of the vessel, then overflows vessel walls. In such a way vessel's top portion has fixed level free liquid surface. Disposed liquid is collected in collection tank and is drained to the pipeline with gravity flow. At the beginning of measurement cycle control and signal processing circuit activates transmitter's emission pulse. Such emission will not cause first photoelectric receiver's flashing even under transmitter's divergent stream at zero particles content, as liquid surface reflections are prevented by top portion of the baffle, and vessel bottom reflections are cut-off due to near-bottom bend of the same baffle. Baffle slot is done in such a way to prevent transmitter's beam coming to this slot edges at zero particles content. Suspended particles concentration increase causes increase of the portion of stream being horizontally dispersed by the particles and passing over the slot, wherein dispersed stream passed beyond the slot left to right will decrease with exponential dependence in compliance with Bouguer-lambert-Beer law. Horizontal stream dissipates in all the directions, including liquid surface direction. Brightness of emission from surface is measured by the first and second photoelectric receivers. Moreover under photoelectric receivers' identity photo-electric current $I_{1L}$ at first photoelectric receiver's output will always be higher than photo-electric current $I_{2L}$ at the second photoelectric receiver's output and the higher turbidity (particles content c) will be, the higher first to second ratio multiplicity will become. L index corresponds to the left active transmitter. Measured $I_{1L}$ and $I_{2L}$ values are stored to circuit's operative memory. Further on same circuit turns off transmitter, turns on the other transmitter 6 (right-hand in the diagram) and same way as it was in the first cycle of operation measures photo-electric currents of the first and second photoelectric receivers. In this case second photoelectric receiver's photo-electric current will be higher than first one's. Similar way $I_{1R}$ and $I_{2R}$ values are stored to circuit's random access memory. Then circuit calculates next relation being the function of concentration and does not depend on data communication (optic) channel instability $$R = \frac{I_{1L} \cdot I_{2R}}{I_{2L} \cdot I_{1R}} = F(c), \qquad (1)$$

whereas R is computational result, $I_{1L}$, $I_{2L}$—photo-electric currents of the first and second photoelectric receivers accordingly with left hand transmitter on;

$I_{1R}$, $I_{2R}$—photo-electric currents of the first and second photoelectric receivers accordingly with right hand transmitter on;

F(c)—some function of Concentration of suspended particles

Then with calibration curve pre-stored to the memory the desired concentration c=φ(R) is found, whereas φ is function reverse to F. Computed value will be transmitted to (an external) equipment (indicators, control devices, etc.) through interface cable.

Thereupon cycle repeats.

Same source describes non-contact type in-flow turbidity meter, consisting of topside open major vessel with branch pipe in the bottom side portion to supply fluid, collecting tank to dispose liquid running over the top of the major vessel, transmitter and photoelectric receiver located over liquid surface. Major vessel is arranged vertically, second transmitter and second photoelectric receiver are also placed over liquid surface, transmitters' and photoelectric receivers' axes are parallel and vertical, they are coplanar, transmitters' axes are faced to major vessel walls and photoelectric receivers' axes—to the center of the vessel. First transmitter and photoelectric receiver are divided with vertical light tight baffle with horizontal slot being in the liquid in proximity to its surface, and bottom edge folded to vessel's center and not contacting major vessel bottom. Second transmitter and photoelectric receiver are located symmetrically to the first ones with respect to vessel axis and are also divided with similar baffle, outputs of all transmitters and photoelectric receivers are connected to control and signals processing circuit.

Method disadvantage is that it allows to identify general contamination based on water surface layer reflection and does not allow to identify pollution class or type. Herewith the shortages of the device itself affect result reliability. Device shortage is in low metrological reliability of measuring equipment caused by the fact that possible deterioration (possible changes in windows transparency of transmitter and photoelectric receiver) of transmitter and photoelectric receiver windows clarity (due to fogging, splashing, dusting, and ageing) will cause inaccuracy of measurements. Transmitter and photoelectric receiver parameters instability will also result in measurement inaccuracy. Liquid consumption variation can cause minor (1-3 mm) change of liquid level which will also result in signal change at photoelectric receiver output. Evident error can also be caused by re-reflection from vessel bottom and walls and diffuse reflection from liquid surface.

There is provided a method and system that achieve reliability of acquired data and simplification of the device to get high quality picture with respect to liquid or air pollution class.

Said technical result for this method is reached through particles detection in liquid based on the principle when light flux is passed through analyzed liquid from transmitter side and photoelectric receiver record light flux intensity at the output from analyzed liquid, while liquid pollution is assessed with amount of difference in light flux incoming analyzed liquid and light fluxes going out of it. Transmitter sends light flux to analyzed liquid at varied pulse frequency, pulses intensity and light wave length in various ranges of nanometers each of which corresponds to specific type of polluting particles. The comparison is done between light fluxes incoming to analyzed liquid and out coming it for each range of light wave length and incase difference identified detect admixtures in the liquid corresponding the type of pollutions causing change in liquid's absorption properties.

Reported technical result for devices is achieved by means of particles in liquid detection system containing light flux source and oppositely arranged receiver of light flux passed through analyzed liquid, light flux intensity comparator unit to compare light fluxes intensity prior to passing through analyzed liquid and after it connected with computer-aided device to identify pollution type with absorption properties of liquid as well as facilities to supply and remove analyzed liquid from light flux passage area; it is equipped with all-glass tube with analyzed liquid supply nozzle and the other one—with analyzed liquid removal nozzle. Transmitter is the unit installed at the end of glass pipe with mounted nozzle to supply analyzed liquid. Transmitter includes lens arranged immediately in front of glass tube inlet, with inclined optically transparent plate arranged ahead of it used to direct to lens light fluxes from specific source of light emission located with emission direction vector oriented to this plate, along with light flux intensity sensor located over optically transparent plate, Receiver to record light flux consists of the unit installed at the end of glass pipe with mounted nozzle of analyzed liquid release, including lens opposite to which beam splitter is located along with IR and UV receivers of light emission from beam splitter.

Herewith computer-aided device has control function to supply light flux from individual emitting sources to analyzed liquid in pulses with variety of pulse frequencies, intensity and light wave length in various ranges of nanometers, each of which corresponds to individual type of pollution particles, and comparison function to compare light flux entering analyzed liquid and light flux out coming such liquid for each range of light wave length and in case difference identified—to identify foreign particles presence in the liquid corresponding to the type of pollution causing liquid's absorption properties change.

Said technical result for this method is also reached through particles detection in the air based on the principle when analyzed air is passed through liquid then when air is passed through liquid light flux is supplied from transmitter side and passes through liquid and photoelectric receiver records light flux intensity at liquid output, while transmitter sends light flux to the liquid at varied pulse frequency, pulses intensity and light wave length in various ranges of nanometers each of which corresponds specific type of polluting particles. The comparison is done between light fluxes incoming to the liquid and out coming it for each range of light wave length and in case difference identified detect admixtures in the air corresponding the type of pollutions causing change in liquid's absorption properties.

Said features are essential ones and interconnected with steady set of essential features creation sufficient to get required technical result.

This invention is explained with embodiment which although is not the only one possible, however clearly demonstrate possibility to reach required technical result with brought cumulative features.

In accordance with the present invention new approach to particles detection (identification) in liquid is considered.

Particles (or elements) here mean pollutions which can present in liquid—water, in the form of microparticles or nanoparticles. Pollution here means:
  biological (bacteria, viruses, various microorganisms, etc.).
  chemical (any types of toxins, traces of chemical agents, detergents, fragments of mineral fertilizers and inorganic fertilizers, medicinal preparations, etc.)
  general contamination.

Particles in liquid detection method, first of all the particles contaminating liquid, is based on the principle when light flux is passed through analyzed liquid from transmitter side and photoelectric receiver records light flux intensity at the output from analyzed liquid, while liquid pollution is assessed with amount of difference in light flux incoming analyzed liquid and light fluxes going out of it. This principle is widely used at the moment. However this technique allows detecting single type or class of pollution only. It is caused by the fact that liquid transparency depends on the wave length of light emission going through analyzed liquid. The result is also affected with availability of light reflecting components and causing interference elements, which are always present in the liquid or its environment.

To allow reliable result obtaining and to provide possibility to identify not only specific type of pollution and not only total haze, but to detail class or type of pollution new method suggests to supply light flux from transmitter to the liquid subject to analysis in pulses with diverse pulses frequency, intensity and wave length in various range of nanometers each of which corresponds to specific type of pollution particles.

Then comparison of light flux coming into analyzed liquid and going out of it is done for each range of light wave length and in case difference is found, foreign particles presence in the liquid is identified corresponding to the type of pollution causing liquid absorption properties change.

Method is based on the principle of light with certain wave length effect on micro particles present in transparent liquid (in this particular case in the water). The following analysis procedure is done using above stated principle.

Light flux of various wave length and intensity selected depending on the purpose of analysis passes through analyzed liquid. Thus wave length of 280-285 nanometers length is used to identify bio particles. To identify other type particles wave length shall be selected in such a way to provide maximum effect on the particles. Light flux is supplied in pulses of different frequency and intensity. Frequency modulation is used to advance noise stability. Intensive random motion of analyzed particles in the liquid is reached with special algorithm to control above mentioned parameters of the light flux. It results in tested liquid's absorption properties change sensed by receiving sensor. Obtained data is processed with special algorithm. Processing results allow identifying micro particles concentration with high sensitivity, up to several dozens of micro particles in 1 milliliter of liquid.

In such a way offered method has sufficient versatility, allowing using it to design and manufacture device to analyze both liquids and gases.

Light effect is used to excite intensive random movement of micro particles in the liquid. It causes liquid absorption properties change.

Light flux is supplied in pulses. Varying pulse frequency, intensity and light wave length we get maximum value of light absorption by analyzed liquid.

Algorithm has been developed allowing identifying micro particles in the liquid with high sensitivity level based on light absorption.

This technique is realized by the following system, which can be installed as follows:
  in water supply system: cities, building clusters, residential houses, industrial facilities and any other sites requiring continuous monitoring of water quality. It is connected to water supply systems with branch pipe. The system operates independently and in case water pollution sends signals to control center defining pollution location and degree.
  open water. Devices can be installed in the various sports of open water having even water quality. Analyzed water is pumped to the device with micro pump (included in device's scope of supply). In case pollution sends signal to control center indicating pollution location and degree. Number of devices required per one basin is established depending on water quality heterogeneity and number of areas with various degree of uniformity.

In compliance with the invention particles in liquid detecting system contains liquid flux transmitter 1 and arranged opposite to it light sensor 2 to record light flux passed through analyzed liquid, as well as analyzed liquid supply means 3 and release means 4 to take it out of luminous flux (FIGS. 1 and 2).

The system is equipped with glass tube 5, one end of which has connection branch 6 to supply analyzed liquid, and the other end has connection branch 7 mounted to release analyzed liquid.

Transmitter (FIG. 3) is unit 8 mounted at the end of glass tube 5 with analyzed liquid branch connection 6 installed on it.

Said unit 8 includes lens 9, placed immediately pre-entry to the glass tube 5, in front of which inclined optically transparent plate 10 arranged to direct to lens side 9 lights\ fluxes from 11 (LED-sources и ) individual sources of luminous radiation arranged with radiation vector oriented to this plate. Unit also contains light intensity sensor 12 located over optically transparent plate.

Receiver (FIG. 4) to record light flux is unit 13 mounted at the end of glass tube 5 having branch connection 7 to release analyzed liquid. This unit 13 includes lens 14 at glass lens outlet. Beam splitter 15 is arranged opposite to lens 14, and beam splitter's light flux receivers IR 16 и UV 17 are located behind the beam splitter.

System operates based on light fluxes comparison principle comparing light flux prior to its passage through analyzed liquid and post-passage one. This data is communicated through corresponding unit to computer-aided device 18 (also referred to as controller) to identify pollution type through change of liquid's absorption properties in compliance with preprogrammed algorithm in compliance with which each type pollution is manifested with liquid light absorption properties decrease at the certain light wave. The system may also include a communication unit 19 for communicating with other devices such as a server, another computer, another particles in liquid detecting system. The communication may be a short range transmission, long range transmission, wireless communication, wired communication and type of known communication.

This computer-aided device 18 has control function to control individual light emission sources supplying light flux to analyzed liquid in pulses with various pulse frequency, intensity and light wave length in various ranges of nanometers, each of which corresponds to individual type of pollution particles, and comparison function to compare light flux entering analyzed liquid and light flux out coming such liquid for each range of light wave length and in case difference identified—to identify foreign particles presence in the liquid corresponding to the type of pollution causing liquid's absorption properties change.

This system:
a. Allows detecting various types of the particles and their concentration, including bio particles, provided high sensitivity level.
b. Has quite simple design and is cheap to fabricate. Its fair overall dimensions make it possible to place the device in diverse locations.
c. The device has quite high reliability degree due to simple design.
d. The device does not require auxiliary facilities or materials to calibrate it.
e. The device is easy to operate and cost effective, it does not require any consumables.
f. Analysis results can be electronically communicated to control center.

Same principle is used to analyze air pollution. To do that air (gas) flows through special chamber (bubble flask) where air (gas) is absorbed by liquid. Then liquid is subjected to analysis based on above method. It allows detecting various contaminating particles presence in the air (gas) with high sensitivity.

Claimed method to detect pollutions in the liquid can be also used to detect particles in the air. This alternate method consists in that analyzed air is sent through liquid (with pre-set known and invariable optical properties), then while air passes through the liquid light flux is sent through the liquid from transmitter side and light flux receiver record light flux intensity as it lease the liquid.

Therewith transmitter's light flux is sent to the liquid in pulses with variable pulse frequency, and light wave length in various ranges of nanometers each of which corresponds to specific type of pollution particles. Then light flux entering liquid and light flux leaving it are compared for each range of light wave length and in case difference is found, foreign particles in the air are identified corresponding to the type of pollution causing liquid absorption properties change.

This alternate method is working based on the same principle with described above pollution detection in liquid. When polluted air comes into the liquid with known optical properties, liquid optical properties change.

See in FIG. 5 flow chart of the device allowing evaluating air pollution. Pumped with pump 20 (compressed air pump) the air passes through tube 21 to the bath 22 filled with liquid, where it is blended with the liquid. Thereupon air leaves liquid (as tube has positive pressure) and rising up in the cavity around the tube is released to atmosphere through outlet connection 23. This device uses bubble flask to detect particles in the air. Bubble flask includes tubular body with plugged ends one of which functions as bottom of analyzed liquid bath, tube to supply air in bath bottom direction arranged in this body, with openings letting air to pass from the tube to bath cavity done in the bottom portion of the tube. Tube's external wall and body internal wall is featured with boss arrangements or indentations to create labyrinth form air passage from bath to atmosphere.

Bath bottom is featured with indentations or boss arrangements to mix liquid and air passing through it and body walls in bath area openings are done to connect analyzed liquid supply and removal devices.

The device is also equipped with particles detecting in water system 24 designed same ways as above described system pictured on the FIG. 2-4. Reliable data obtaining algorithm is based on water pollution transfer to air pollution and vice versa.

FIG. 6 shows general view and arrangement of the device to detect particles in the air using liquid (water). Bubble flask 26 is fixed in the body 25 (FIG. 7). Bubble flask consists of the tube 27 with air supplied to the top of it from suction fan 28. Tube 27 is immersed to the bath 29 and has in its lower portion immersed to the bath nearby the bottom openings 30 to provide fractional output of pressurized air to bath cavity 31. Bath cavity is filled with liquid (water). Specific feature of bath design is the necessity to provide air and water mixing while air passaging through liquid to create homogenous gas-liquid medium. This is achieved with indentations and/or bosses 32 arranged on bath bottom and probably on its walls, or other elements facilitating liquid and air bubbling (mixing them) and with labyrinth form displacement of air leaving the liquid. Also boss arrangements 33 are provided on internal wall of bubbling flask's tubular body internal wall and external surface of tube 27 to decelerate air leaving the bath with labyrinth form air stream movement released to atmosphere through the opening in bubble flask tubular body 34 wall, which can be used to install connecting branch 23. These design features of bubble flask are intentionally done to achieve liquid in bath homogenous mixing with air throughout the bath. It is necessary as optical component's liquid analysis is done on condition that liquid is homogenous with regards to structural composition and volume. Herewith these bosses or indentations, or other elements are used to take liquid splashes entrapped by air back to the bath.

Body 25 also contains load cell 35 of the bubble flask 26, connected with control valve 36, liquid level sensor 37, installed in accumulator tank 38, connected with bubble flask, dispenser micro pumps unit 39 used to maintain pre-set liquid level in the bath and in glass tube 5 with unit 8 and 13 at its ends arranged in full concordance with earlier described design in compliance with FIG. 2-4, and electronic control unit.

Connecting branches of units 8 and 13 are connected to bubble flask bath in such a way to provide liquid passage through the tube.

This invention is industrially applicable and can be used for environmental monitoring.

There may be provide a method for detecting particles in a liquid, the method may include having a light flux to pass through analyzed liquid from transmitter side and as it outcomes analyzed liquid light flux receiver records light flux intensity, herewith liquid pollution is evaluated with the difference of light flux entering liquid and light flux leaving it, light flux is sent to analyzed liquid from transmitter in pulses of various frequency, intensity and light wave length in the various ranges of nanometers each of which corresponds to individual type pollution particles, then comparison of light flux entering analyzed liquid and leaving it is done for each range of light wave length and in case difference is found, foreign particles in liquid are identified corresponding the type of pollution causing liquid absorption properties change.

There may be provided a system. Particles in liquid detection system including light flux transmitter and located opposite to it receiver to record light flux passed through analyzed liquid, comparator unit to compare light flux intensity prior to its entry to analyzed liquid and after its leaving it connected with computer-aided device to detect pollution type based on liquid absorption properties change, as well as device to supply and remove analyzed liquid from light flux passage area, it is completed with glass tube one end of which has connecting branch to supply analyzed liquid and the other one has connection branch to remove analyzed liquid. Transmitter is the unit installed at the end of glass pipe with mounted nozzle of analyzed liquid supply. Transmitter includes lens arranged immediately in front of glass tube inlet, with inclined optically transparent plate arranged in front of it used to direct to lens light fluxes from individual source of light emission located with emission direction vector oriented to this plate, along with light flux intensity sensor located over optically transparent plate, Receiver to record light flux consists of the unit installed over optically transparent plate. Light emission flux receiver is the unit installed at the end of glass tube with connecting branch mounted to remove analyzed liquid. This unit contains lens arranged at glass tube outlet opposite to which inclined beam splitter and IR and UV sensors to receive light emitted by beam splitter are arranged.

The system has a computer-aided device that has control function of individual light sources supplying light flux to analyzed liquid in pulses of varying frequency, intensity and light wave length in the various ranges of nanometers, each of which corresponds to individual type pollution particles, then comparison of light flux entering analyzed liquid and leaving it is done for each range of light wave length and in case difference is found, foreign particles in liquid are identified corresponding the type of pollution causing liquid absorption properties change.

The method may include sending analyzed air through liquid, then while air passes through the liquid light flux is sent through the liquid from transmitter side and light flux receiver record light flux intensity as it leaves the liquid. Therewith transmitter's light flux is sent to the liquid in pulses with variable pulse frequency, and light wave length in various ranges of nanometers each of which corresponds specific type of pollution particles. Then light flux entering liquid and light flux leaving it are compared for each range of light wave length and in case difference is found, foreign particles in the air are identified corresponding to the type of pollution causing liquid absorption properties change.

The system may include a bubble flask to mix air and water, light flux transmitter and arranged oppositely receiver to record light flux passed through analyzed liquid, comparator unit to compare light flux prior to it coming into analyzed liquid and after it leaving analyzed liquid, connected with computer-aided device to detect type of pollution based on liquid absorption properties change, along with devices to supply and remove analyzed liquid from light flux passage area, the system is equipped with glass tube, one end of which has connection branch to supply analyzed liquid coming from bubble flask, and the other end has connection branch mounted to release analyzed liquid. Transmitter is the unit mounted at the end of glass tube with analyzed liquid supply branch connection installed on it, including lens placed immediately pre-entry to the glass tube in front of which inclined optically transparent plate is located to direct light fluxes from individual light sources with light vector directed to this plate, to lens side, and light flux intensity sensor arranged over optically transparent plate. Receiver to record light flux is the unit installed on the end of glass tube with analyzed liquid release connection branch mounted on it, including lens at glass tube outlet with inclined beam splitter opposite to it and beam splitter's IR and UV light flux receivers.

Bubble flask used to detect particles in the air includes tubular body with plugged ends one of which functions as bottom of analyzed liquid bath, tube to supply air in bath bottom direction arranged in this body, with openings letting air to pass from the tube to bath cavity done in the bottom portion of the tube. Tube's external wall and body internal wall is featured with boss arrangements or indentations to create labyrinth form air passage from bath to atmosphere.

The bubble flask has indentations or boss arrangements done on bath's bottom to mix liquid and air passing through it.

The bubble flask may have openings done in body walls in bath area to connect analyzed liquid supply and removal devices.

FIG. 8 illustrates a system according to an embodiment of the invention. FIG. 8 illustrates a system in which an inlet 301 of the bath 22 and outlet 302 of the bath are liquidly coupled to each other—fluid that exits outlet 302 may pass through one or more liquid conduits before reentering inlet 301. Fluid may be supplied to inlet 301 via first sampling point 201. Some or all of the liquid may be drained (or sent outside the loop between inlet 301 and outlet 302) via outlet 303. The first sampling point 201 may supply liquid in a continuous or non-continuous manner during the analysis process. Outlet 202 may drain liquid in a continuous or non-continuous manner after or during the analysis process.

Figure 9:
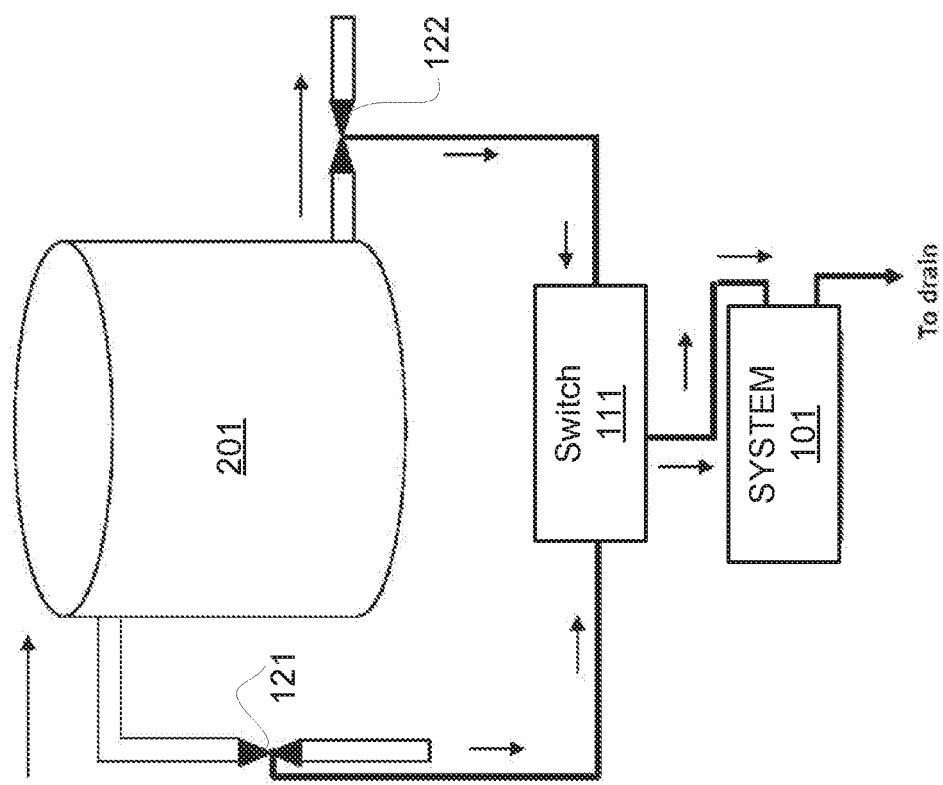
FIG. 9 illustrates a system and a monitored device according to an embodiment of the invention.

FIG. 9 illustrates a system 101 and a monitored device 201 (such as a container, a liquid purifier or any other device that may process the liquid) according to an embodiment of the invention. First sampling point 201 precedes the monitored device 201. Second sampling point 202 follows the monitored device 201.

Switch 111 is liquidly coupled to first and second sampling points 201 and 202 and may select which sampling point to open. This allows to analyze the liquid before and after the monitored device operated on the fluid—and evaluate the quality, efficiency (or any other parameter) of the process executed by the monitored device.

Liquid outputted from system 101 may be drained or sent elsewhere.

It should be noted that different monitored devices may require different liquid purity levels. A liquid purifier may be required to provide a purer liquid that a storage container. Deviations from a require liquid purity may trigger an alert.

Figure 10:
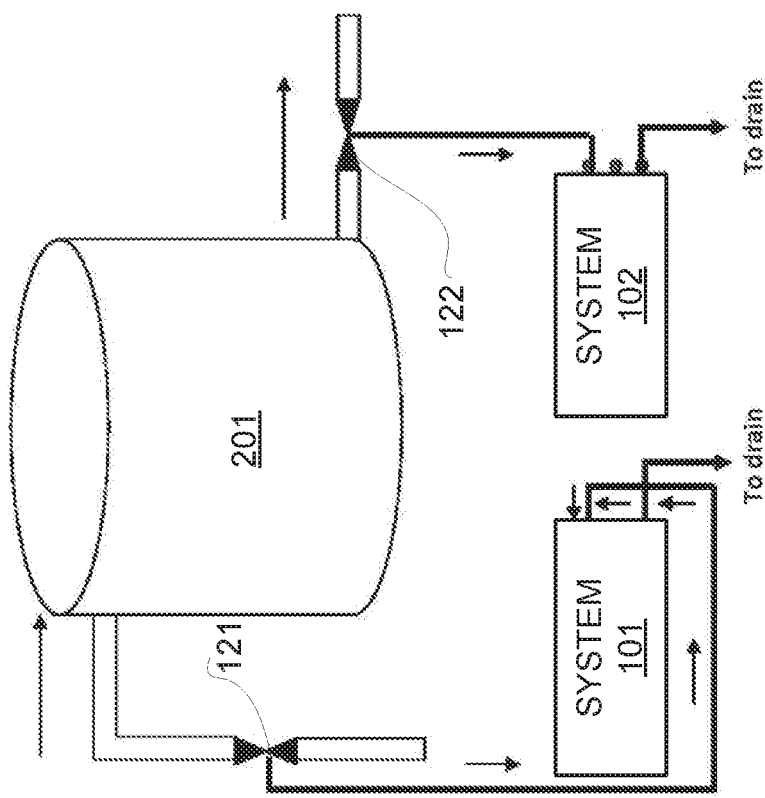
FIG. 10 illustrates two systems and a monitored device according to an embodiment of the invention.

FIG. 10 illustrates two systems 101 and 102 monitored device 201 according to an embodiment of the invention.

In FIG. 10 there is no switch—system 101 analyzes liquid from first sampling point 201 and system 102 analyzes liquid from second sampling point 202.

Liquid outputted from each one of system 101 and system 102 may be drained or sent elsewhere.

Figure 11:
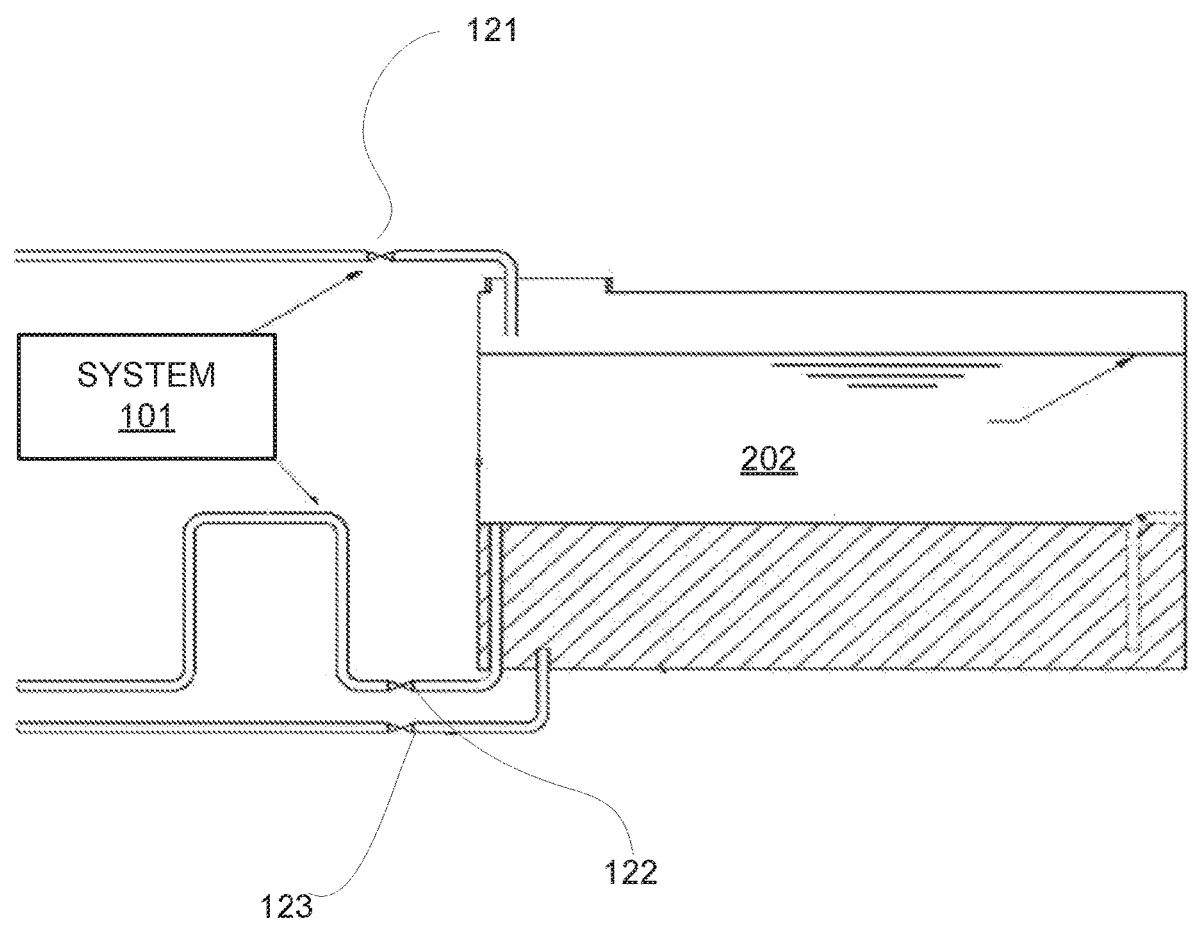
FIG. 11 illustrates a system and a monitored device according to an embodiment of the invention.

FIG. 11 illustrates a system and a monitored device according to an embodiment of the invention.

System 101 is liquidly coupled to multiple sampling points 201, 202 and 203 and may sample (via a switch—not shown) the fluid from these sampling points. First sampling point 201 precedes the monitored device 202 (such as building water reservoir), second and third sampling points 202 and 203 may receive fluid from different locations of the monitored device 202.

Figure 12:
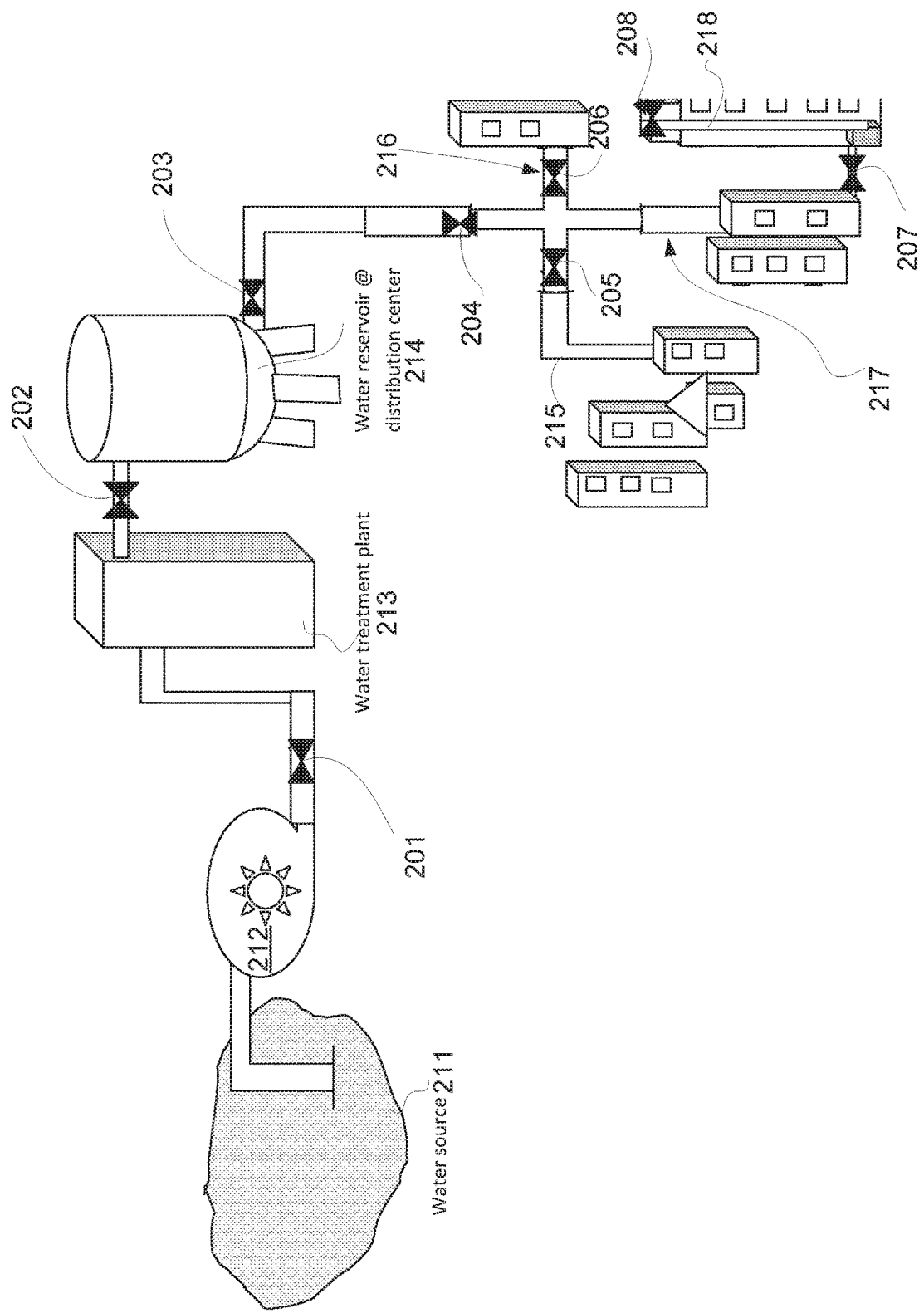
FIG. 12 multiple sampling points and an irrigation system according to an embodiment of the invention.

FIG. 12 multiple sampling points and an irrigation system according to an embodiment of the invention.

The irrigation system includes water source 211, pumps 212, water treatment plant 213, water reservoir 214 of a distribution system, multiple branches 215, 216, 217 and 218 (leading to different buildings).

First sampling point 201 is positioned between pumps 212 and water treatment plant 213.

Second sampling point 202 is positioned between water treatment plant 213 and water reservoir 214.

Third sampling point 203 is located after water reservoir 214 and before branches 215-218.

Fourth sampling point 204 is located after third sampling point—but precedes branches 215-218.

Fifth sampling point 205 is located within branch 215.

Sixth sampling point 206 is located within branch 216.

Seventh sampling point 207 is located within branch 217.

Sixth sampling point 208 is located within branch 218.

Figure 13:
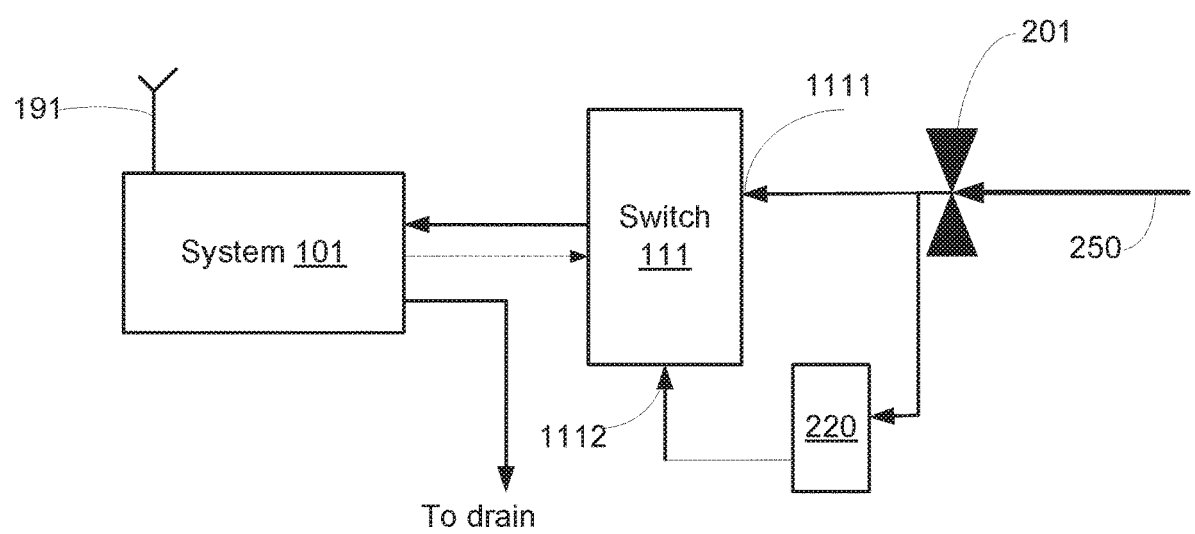
FIG. 13 illustrates a system and a cleaning unit according to an embodiment of the invention.

FIG. 13 illustrates a system and a cleaning unit according to an embodiment of the invention.

System 101 has a fluid inlet that is fed (with fluid) by switch 111. System 101 may send control signals for controlling switch 111. System 101 includes antenna 191 (of communication unit) and may also include an outlet that may output liquid to the drain (or to another location).

Switch 111 includes a first inlet 1111 and a second inlet 1112. The first inlet 1111 receives liquid from first sampling point 201 (that samples liquid from conduit 250). The second inlet 1112 receives liquid (with cleaning materials) from cleaning unit 220. Cleaning unit may be fed by fluid from first sampling point 201 and may mix the liquid with a cleaning solvent.

When the system 101 is cleaned—switch 111 selects second inlet 1112. Else—switch 111 may select inlet 1111.

Figure 14:
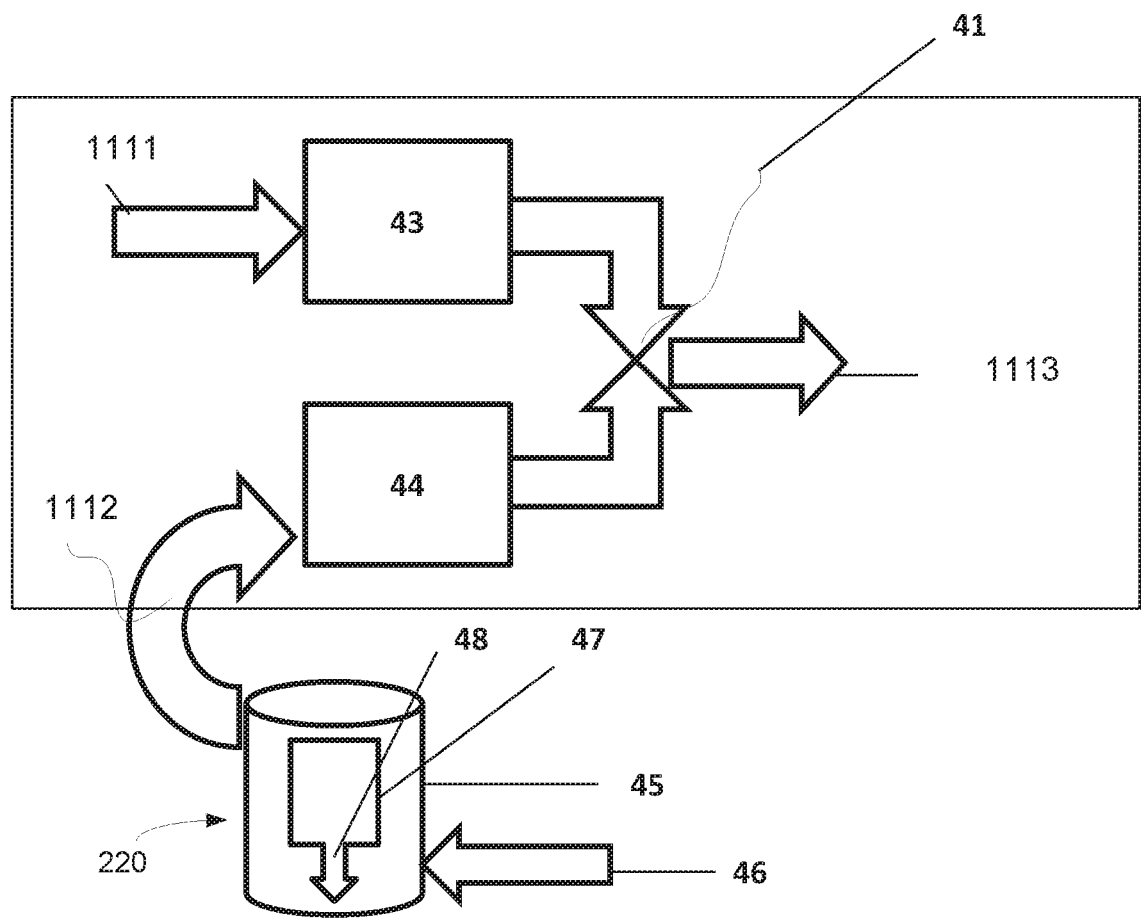
FIG. 14 illustrates a switch according to an embodiment of the invention.

FIG. 14 illustrates a switch according to an embodiment of the invention.

First inlet 1111 is followed by first valve 43.

Second inlet 1112 is followed by second valve 44.

First and second valves are followed by mixer 41 and outlet 3.

First and second valves 43 and 44 may be opened or closed in order to determine which fluid will be outputted by switch 111.

Cleaning unit 220 is illustrated as including a container 47 for receiving cleaning material (such as a cleaning solvent) that is mixed (48) with fluid (denoted 46).

Figure 15:
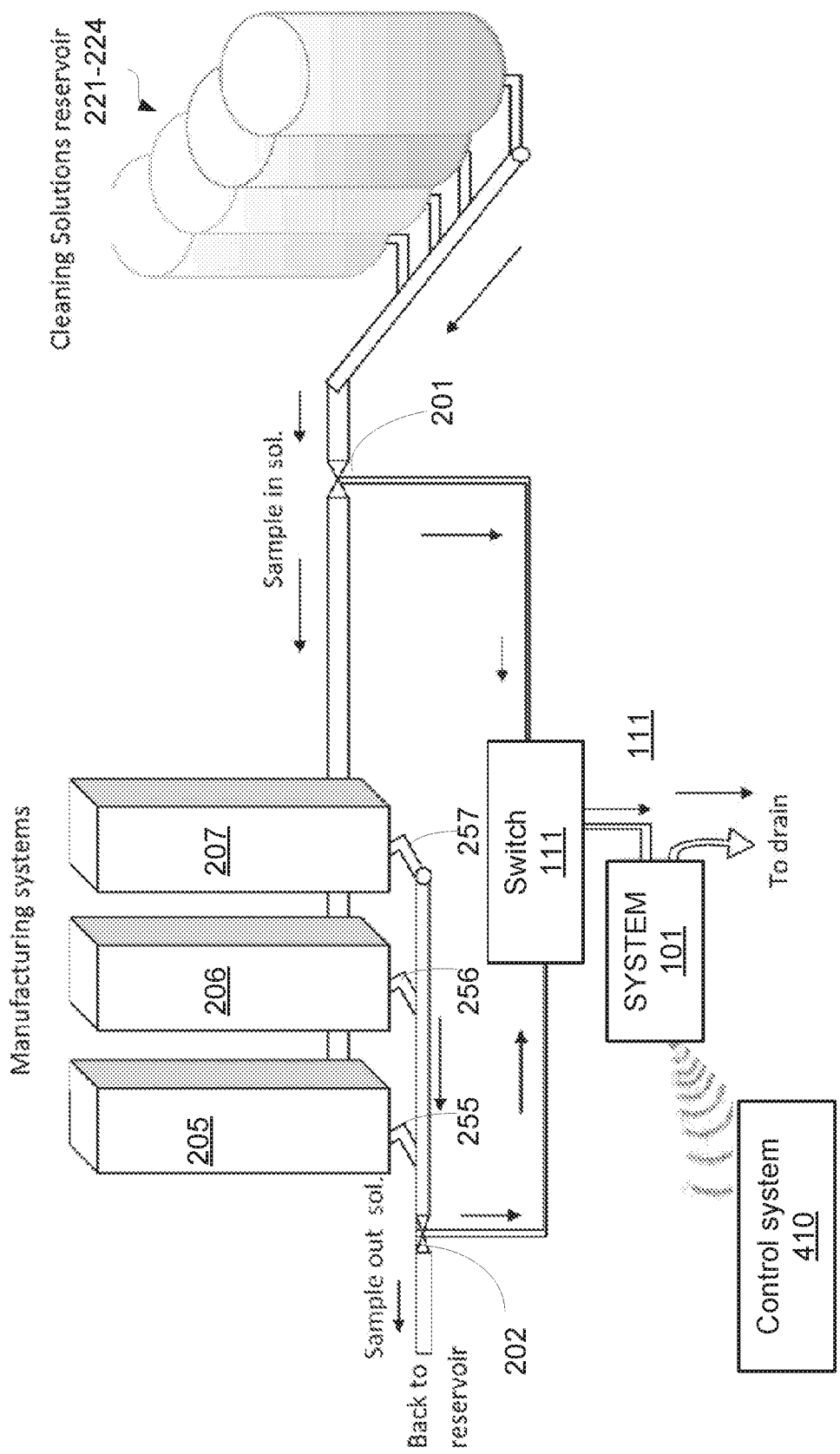
FIG. 15 illustrates a system and multiple monitored device according to an embodiment of the invention.

FIG. 15 illustrates a system and multiple monitored device according to an embodiment of the invention.

System 101 is coupled to switch 111 that may receive fluid from a first sampling point 201 and from a second sampling point 202. The first sampling point 201 precedes manufacturing units 205, 206 and 207 while the second sampling point follows manufacturing units 205, 206 and 207.

The manufacturing units 205, 206 and 207 may process liquid, may be a source of liquid (such as but not limited to milk).

The liquid from manufacturing units 205, 206 and 207 may be controlled by valves 255, 256 and 257 respectively. Cleaning solutions stored in cleaning solution reservoirs 221-224 may be fed (for example via first sampling point 201) to manufacturing units 205, 206 and 207. During a cleaning process.

System 101 may transmit information (such as analysis results) to a control system 410. Any type of control system 410 may be provided. The control system may be manned or unmanned. A person may receive analysis information from system 101. The control system 410 may control system 101, and/or switch 111 and/or first and second sampling points, and/or cleaning solution reservoirs and/or manufacturing units 205, 206 and 207.

Figure 16:
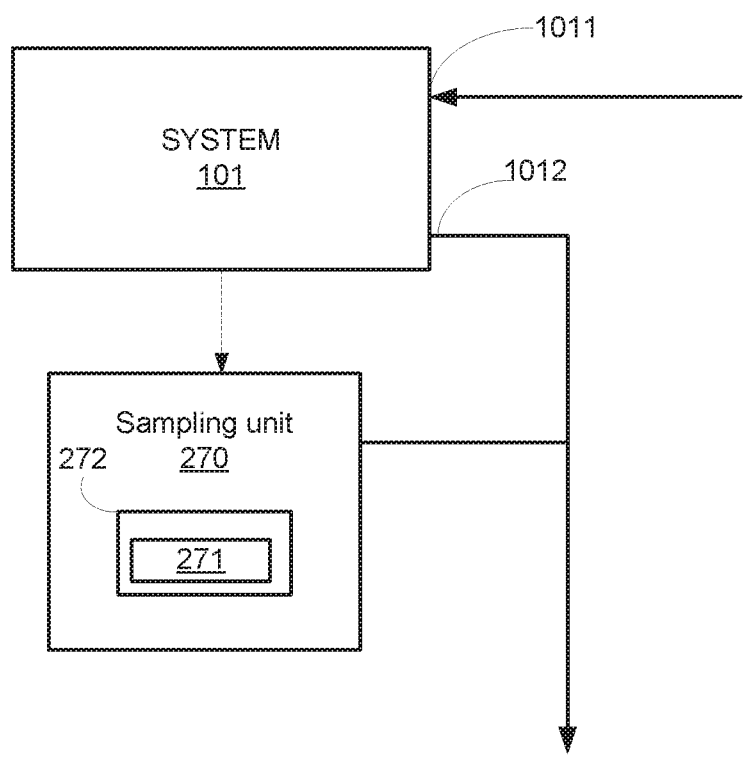
FIG. 16 illustrates a system and a sampling unit according to an embodiment of the invention.

FIG. 16 illustrates a system and a sampling unit 270 according to an embodiment of the invention.

Sampling unit 270 may be included within system 101.

Sampling unit 270 may include one or more containers 271 for receiving fluid (under the control of system 101) once system 101 determined that a certain event occurred (for example—the liquid was polluted by a certain foreign particle, the overall level of pollution has exceeds a threshold and/or was below the threshold or equaled the threshold, the overall level of a certain foreign particle exceeded a threshold and/or was below the threshold or equaled the threshold). The sampling by the sampling unit 270 may be triggered periodically, in any predefined manner, in a random manner, in a pseudo random manner and the like.

Once a sampling is triggered the sampling unit 270 obtains a sample of the liquid that was just analyzed by system 101 and stores the sample at a container 271.

The container 271 may be maintained in predefined conditions (for example at a certain temperature)—by unit 272 (for example a cooler)—until the sample (and possible the container 271) are taken for further analysis.

Sampling unit 270 allows real time sampling of the liquid.

It has been found that the transmission of pulses that comprise frequency components within a first frequency range that correspond to a first wavelength range of 750 to 820 nanometers provide information about the overall turbidity of the liquid, pulses that comprise frequency components within a second frequency range that correspond to a second wavelength range of 280 to 285 nanometers provide information about the presence of bacteria and pulses that comprise frequency components within a third frequency range that corresponds to a third wavelength range of 450 to 454 nanometers provide information about organic materials.

According to an embodiment of the invention the presence of bacteria (or a significant presence of bacteria) may be sensed when the ratio between (a) the intensity of detection signals detected as a result of the transmission of second frequency range pulses and (b) the intensity of detection signals detected as a result of the transmission of first frequency range pulses—exceeds two or three.

According to an embodiment of the invention the presence of organic materials (or a significant presence of organic material) may be sensed when the ratio between (a) the intensity of detection signals detected as a result of the transmission of third frequency range pulses and (b) the intensity of detection signals detected as a result of the transmission of first frequency range pulses —exceeds two or three.

During a multiple phase cleaning process different chemicals may be applied and these phases (at least a completion criterion for the completion of the phases) may be measured by different iterations of fluid analysis. The last phase may include cleaning by pure water- and the analysis may include transmitting first frequency range pulses and at least one out of second frequency range pulses and third frequency range pulses. Previous phases may be monitored by using (for example) only first frequency range pulses. Any combination of pulses may be used for monitoring each phase.

Figure 17:
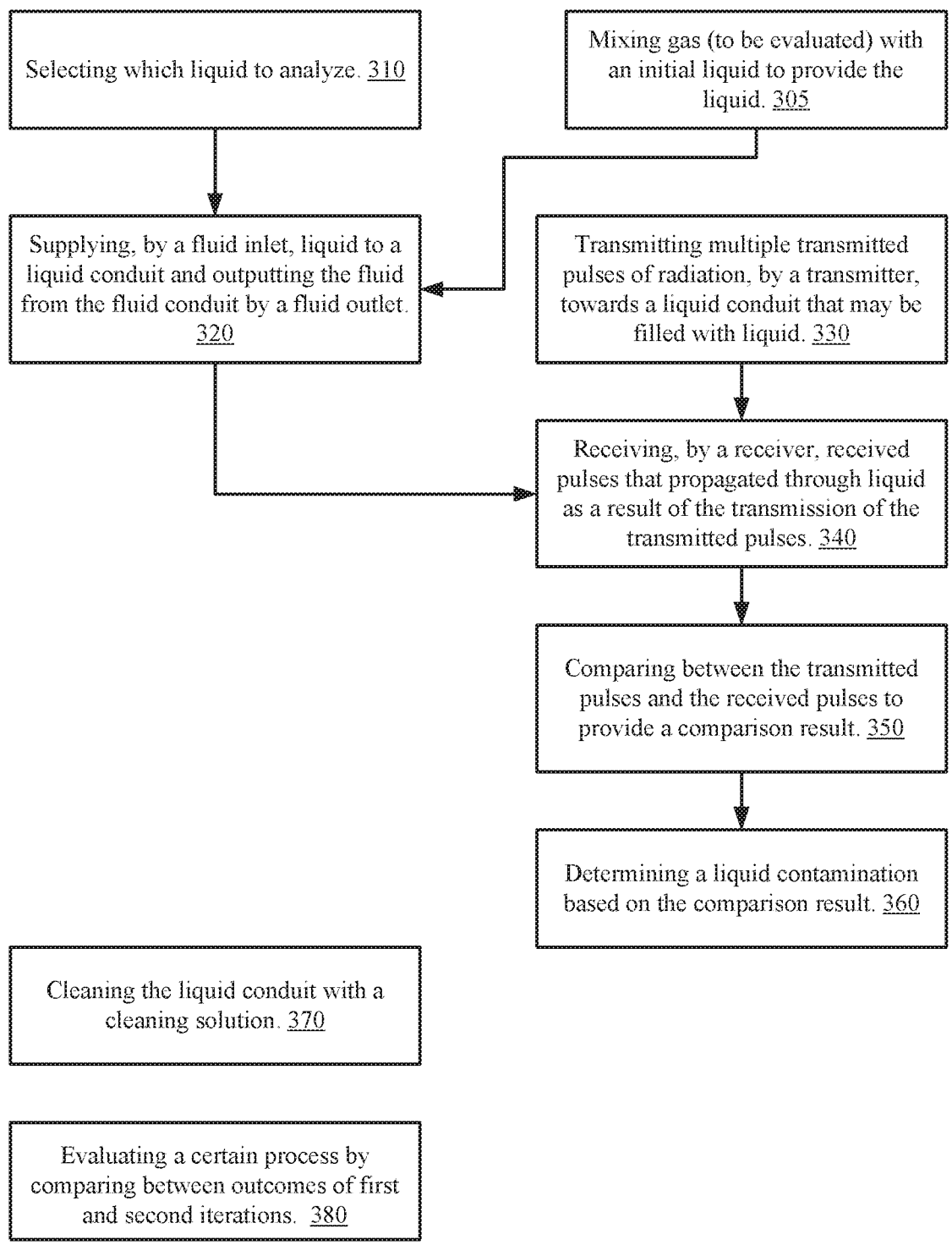
FIG. 17 illustrates a method according to an embodiment of the invention.

FIG. 17 illustrates method 300 according to an embodiment of the invention.

Method 300 may start by steps 320 and 330.

Step 320 may include supplying, by a fluid inlet, liquid to a liquid conduit and outputting the fluid from the fluid conduit by a fluid outlet. A portion of each one of the fluid inlet and the fluid outlet may or may not be oriented to the fluid conduit. See, for example, FIGS. 3 and 4.

The fluid inlet may or may not be fluidly coupled to the fluid outlet. See, for example FIG. 8 versus FIGS. 9-12.

The fluid conduit may have an inner layer that may be at least partially transparent and an external layer that may be reflective. In this fluid conduit the pulses may be reflected from the inner layer (refraction difference between the fluid and the inner layer) and also from the external layer.

Using such a fluid conduit increases the sensitivity of the liquid contamination measurements because the number of received pulses increases due to reflections and/or scattering from the inner and outer layers.

The fluid conduit may have an inner layer that may be reflective. In this fluid conduit the pulses will be reflected from the inner layer.

Step 330 may include transmitting multiple transmitted pulses of radiation, by a transmitter, towards a liquid conduit that may be filled with liquid.

The multiple transmitted pulses may include pulses that differ from each by being associated with absorbance frequencies of different foreign particles.

The transmitted pulses may be of the same intensity or may differ from each other by intensity. Some pulses may be of the same intensity while other pulses may differ from each other by their intensity.

For example, the transmitted pulses may include a first set of pulses that are associated with first absorbance frequencies associated with a first foreign particle and may include a second set of pulses that are associated with second absorbance frequencies associated with a second foreign particle that differs from the first foreign particle.

The number of sets (and the number of different absorbance frequencies) may exceed two, may exceed three, and the like.

The transmitted pulses may include pulses that provide an indication about the overall turbidity of the fluid.

The transmitted pulses may include ultra violet pulses and infrared pulses. Step 330 may include generating the ultra violet pulses by an ultra violet source and generating the infrared pulses by an infrared source The ultra violet source may have an optical axis that may be normal, or oriented or parallel to an optical axis of the infrared source.

Step 330 may also include detecting intensities of the transmitted pulses before the passage of the transmitted pulses through the liquid.

Step 330 may include, for example, transmitting transmitted pulses that may include any combination of the following: (a) one or more pulses that may include frequency components within a first frequency range that correspond to a first wavelength range of 750 to 820 nanometers, (b) one or more pulses that may include frequency components within a second frequency range that correspond to a second wavelength range of 280 to 285 nanometers, and (c) one or more pulses that may include frequency components within a third frequency range that corresponds to a third wavelength range of 450 to 454 nanometers.

Step 330 may be followed by step 340 of receiving, by a receiver, received pulses that propagated through liquid as a result of the transmission of the transmitted pulses. It is noted that the number of received pulses may differ from the number of the transmitted pulses. For example—the number of received pulses may increase as a result of scattering and/or reflection from the liquid conduit and/or from the foreign particles in the liquid. Yet for another example—the number of received pulses may decrease due to a total absorbance of one or more transmitted pulses.

Step 340 may also include detecting intensities of the received pulses.

Step 330 may be executed by a transmitter that may include a transmitter lens that is arranged immediately in front of the first side of the transparent pipe. Step 340 may be executed by a receiver that may include a receiver lens that is arranged immediately after the second side of the transparent pipe. The transmitter lens may be preceded by a transmitter beam splitter and the receiver lens may be preceded by a receiver beam splitter.

Steps 330 and 340 may be followed by step 350 of comparing between the transmitted pulses and the received pulses to provide a comparison result. The comparison may include comparing between intensities of the transmitted pulses and the received pulses. The comparison result provides an indication about the absorbance of the pulses within the liquid. The comparison result may provide an indication about the attenuation per absorbance frequency range. There are multiple transmitted pulses and multiple received pulses and the comparison result may be generated by applying any function (statistical or not) on the intensities of these multiple pulses.

Step 350 may be followed by step 360 of determining a liquid contamination based on the comparison result.

The relationship between the attenuation and the liquid contamination may be learnt during a learning period, may be provided as a look up table or an equation (or in any other manner). The mapping may differ from one foreign particle to another—but this is not necessarily so.

One or more iterations of steps 320, 330, 340, 350 and 360 may be executed.

After one or more iterations of steps 320, 330, 340, 350 and 360 the method may include step 370 of cleaning the liquid conduit with a cleaning solution.

Step 370 may be triggered based on the liquid contamination (for example—when step 360 decides that the liquid is within a contamination range that will require the liquid conduit (exposed to the liquid) to be cleaned. The triggering may be responsive to both contamination levels and time periods during which the contamination levels existed.

Step 370 may include selecting, out of a first fluid inlet for providing the liquid and a second fluid inlet for providing the cleaning solution, the second fluid inlet. See, for example, FIGS. 13 and 14.

When multiple iterations of steps 320, 330, 340, 350 and 360 are executed the method may include generating statistics that reflect the outcome of the multiple iterations.

According to an embodiment of the invention step 320 may be preceded by step 310 of selecting which liquid to analyze.

Step 310 may be executed by the foreign particle detection system or by another entity (such as but not limited to control system 410).

Step 310 may include, for example, selecting a selected sampling point out of multiple sampling points that are liquidly coupled to the liquid conduit.

The selection of the sampling point may involve selecting a liquid path out of multiple liquid paths.

Step 310 may include selecting configuration of a switch (see, for example, FIG. 9), selecting a system for liquid analysis (see, for example, FIG. 10) or selecting any other value of liquid control element (see, for example, valves 255, 256 and 257 of FIG. 15).

The selection may be repeated one or more—and different iterations of steps 320, 330, 340, 350 and 360 may be allocated for analyzing liquids from different sources.

According to an embodiment of the invention the selection a first iteration of the multiple iteration is preceded by selecting a first liquid sampling point for providing a liquid to be analyzed during the first iteration. A second iteration of the multiple iterations is preceded by selecting a second liquid sampling point for providing a liquid to be analyzed during the second iteration.

The execution of two (or more iterations) of steps 320, 330, 340, 350 and 360 may include sampling the liquid from the first sampling point before the liquid undergoes a certain process; and sampling the liquid from the second sampling point after the liquid undergoes the certain process.

When such sampling occurs method 300 may include step 380 of evaluating the certain process by comparing between outcomes of the first and second iterations. It is noted that the first sampling point may be sampled during more than a single iteration and that the second sampling point may be sampled during more than a single iteration.

The certain process may be a liquid purification process, a storage of the liquid, a liquid manufacturing process, a liquid mixing process, and the like.

Step 380 may include evaluating an efficiency of the liquid purification process.

According to an embodiment of the invention multiple iterations of steps 320, 330, 340, 350 and 360 are at different points of time—in order to monitor the progress of a certain process.

Different iterations may be executed before, during and/or after different phases of the certain process.

At least two of the different iterations differ from each other by the pulses transmitted during the iterations.

The one of the different iterations may include transmitting (i) a first set of pulses that comprises pulses that provide information about an overall turbidity of the liquid and (ii) a second set of pulses that comprises pulses that correspond to second absorbance frequency of a certain type of foreign particles.

Another iteration one of the different iterations may include transmitting only a first set of pulses that comprises pulses that provide information about an overall turbidity of the liquid.

The certain process may be a cleaning process of a certain system, the cleaning process may include multiple phases that may differ from each other by the cleaning material that is being used. The properties of the different cleaning materials (after passing through the certain system) may be monitoring using different transmitted pulses.

The completion of one or more phases may be dependent upon the cleanliness level of the certain system.

For example—the cleaning process may include multiple phases that involve using clean water. The clean water may be used, for example, during the final phase of the cleaning process. The cleanliness of the water may be evaluated by executing the iteration of steps 320-360.

According to an embodiment of the invention step 320 is preceded by step 305 of mixing gas (to be evaluated) with an initial liquid to provide the liquid; and wherein the determining of the liquid contamination comprises determining the contamination of the gas. The term initial liquid is a liquid that is mixed with the gas to provide liquid (that is monitored). The initial liquid may be of a known composition.

The gas may be air.

Step 305 may include at least one of the following:
a. Mixing the gas with the initial liquid comprises using a bubble flask.
b. Pumping the air into an input conduit of the bubble flask, the bottom of the bubble flask is immersed within the liquid.
c. Forcing air that exits the liquid to pass through a labyrinth before exiting the bubble flask. The labyrinth may prevent the air from propagating in a pure vertical path from the liquid to an air outlet of the bubble flask.
d. Mixing the initial liquid and the air using a non-flat bath. The non-flat bath may include at least one of indentations and boss arrangements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for detecting foreign particles in a liquid, the method comprising:
   transmitting transmitted pulses of radiation, by a transmitter, towards a liquid conduit that is elongated and filled with liquid; wherein the transmitted pulses comprise pulses that are associated with absorbance frequencies of at least one foreign particle;
   receiving, by a receiver, received pulses that propagated along a path that overlaps a longitudinal axis of the liquid conduit and through liquid as a result of the transmission of the multiple transmitted pulses; wherein a length of path exceeds a width of the liquid conduit;
   wherein the liquid conduit is a transparent pipe; wherein the receiver and the transmitter are optically coupled to first and second sides of the transparent pipe, the first and second sides are opposite to each other; and
   comparing between the transmitted pulses and the received pulses to provide a comparison result.

2. The method according to claim 1 wherein the transmitted pulses comprise pulses that differ from each other by being associated with absorbance frequencies of different foreign particles.

3. The method according to claim 1, comprising: detecting intensities of the transmitted pulses; detecting intensities of the received pulses and wherein the comparing comprises comparing between the intensities of the transmitted pulses and the intensities of the received pulses.

4. The method according to claim 1 wherein the transmitted pulses comprise (a) one or more pulses that comprise frequency components within a first frequency range that corresponds to a first wavelength range of 750 to 820 nanometers, and (b) one or more pulses that comprise frequency components within a second frequency range that corresponds to a second wavelength range of 280 to 285 nanometers.

5. The method according to claim 1 wherein the transmitted pulses comprise (a) one or more pulses that comprise frequency components within a first frequency range that corresponds to a first wavelength range of 750 to 820 nanometers, and (b) one or more pulses that comprise frequency components within a third frequency range that corresponds to a third wavelength range of 450 to 454 nanometers.

6. The method according to claim 1 wherein the transmitted pulses comprise (a) one or more pulses that comprise frequency components within a first frequency range that corresponds to a first wavelength range of 750 to 820 nanometers, (b) one or more pulses that comprise frequency components within a second frequency range that corresponds to a second wavelength range of 280 to 285 nanometers and (c) one or more pulses that comprise frequency components within a third frequency range that corresponds to a third wavelength range of 450 to 454 nanometers.

7. The method according to claim 1 comprising determining a liquid contamination based on the comparison result; triggering a cleaning of the liquid conduit based on the liquid contamination; and cleaning the liquid conduit with a cleaning solution.

8. The method according to claim 1 wherein the transmitter is a unit that is mounted to a first end of the transparent pipe with analyzed liquid branch connection installed on the unit, the first end is located at the first side of the transparent pipe.

9. The method according to claim 1 wherein the transparent pipe is a glass pipe.

10. The method according to claim 1 wherein the transmitter comprises a transmitter lens that is arranged immediately in front of the first side of the transparent pipe and the receiver comprises a receiver lens that is arranged immediately after the second side of the transparent pipe.

11. The method according to claim 1, wherein the transmitter comprises a transmitter lens that is arranged immediately in front of the first side of the transparent pipe and the receiver comprises a receiver beam splitter that is arranged immediately after the second side of the transparent pipe, wherein the transmitter lens is preceded by a transmitter beam splitter and wherein the receiver beam splitter is followed by a receiver lens.

12. The method according to claim 1 comprising performing multiple iterations of the steps of transmitting, receiving, and comparing.

13. The method according to claim 12 comprising generating statistics that reflect the outcome of the multiple iterations.

14. The method according to claim 12 wherein at least one iteration of the multiple iterations is preceded by selecting, out of multiple liquid sampling points, a selected liquid sampling point for providing a liquid to be analyzed during the at least one iteration.

15. The method according to claim 14 wherein the selecting of the selected liquid sampling point comprises selecting between foreign particle detection systems.

16. The method according to claim 14 wherein the selecting of the selected liquid sampling point comprises selecting between liquid paths that lead to a single foreign particle detection system.

17. The method according to claim 12 wherein a first iteration of the multiple iteration is preceded by selecting a first liquid sampling point for providing a liquid to be analyzed during the first iteration; and wherein a second iteration of the multiple iteration is preceded by selecting a second liquid sampling point for providing a liquid to be analyzed during the second iteration.

18. The method according to claim 17 comprising sampling the liquid from the first sampling point before the liquid undergoes a certain process; and sampling the liquid from the second sampling point after the liquid undergoes the certain process.

19. The method according to claim 18 evaluating the certain process by comparing between outcomes of the first and second iterations.

20. The method according to claim 19 wherein the certain process is a liquid purification process.

21. The method according to claim 20 wherein the evaluating comprises evaluating an efficiency of the liquid purification process.

22. The method according to claim 1 wherein the transmitting of the multiple pulses is preceded by mixing gas with an initial liquid to provide the liquid; and wherein the determining of the liquid contamination comprises determining the contamination of the gas.

23. The method according to claim 1 comprises executing multiple iterations of the steps of transmitting, receiving, and comparing; wherein one of the different iterations comprises transmitting (i) a first set of pulses that comprises pulses that provide information about an overall turbidity of the liquid and (ii) a second set of pulses that comprises pulses that correspond to second absorbance frequency of a certain type of foreign particles.

24. The method according to claim 1 wherein the length of the path exceeds the width of the liquid conduit by a factor of more than ten.

25. A foreign particle detection system for detecting foreign particles in a liquid, the system comprising:
    a liquid conduit that is elongated;
    a transmitter that is configured to transmit transmitted pulses of radiation towards the liquid conduit, wherein the liquid conduit is filled with liquid; wherein the transmitted pulses comprise pulses that are associated with absorbance frequencies of one or more foreign particles;
    a receiver that is configured to receive received pulses that propagated along a path that overlaps a longitudinal axis of the liquid conduit and through liquid as a result of the transmission of the multiple transmitted pulses; wherein a length of path exceeds a width of the liquid conduit;
    wherein the liquid conduit is a transparent pipe; wherein the receiver and the transmitter are optically coupled to first and second sides of the transparent pipe, the first and second sides are opposite to each other;
    a controller that is arranged to compare between the transmitted pulses and the received pulses to provide a comparison result and determine a liquid contamination based on the comparison result.

26. The foreign particle detection system according to claim 25 wherein the transmitted pulses comprise pulses that differ from each other by being associated with absorbance frequencies of different foreign particles.

27. The foreign particle detection system according to claim 25, wherein the receiver is configured to detect intensities of the transmitted pulses; detecting intensities of the received pulses and wherein the controller is configured to compare between the intensities of the transmitted pulses and the intensities of the received pulses.

28. The foreign particle detection system according to claim 25 wherein the transmitted pulses comprise (a) one or more pulses that comprise frequency components within a first frequency range that corresponds to a first wavelength range of 750 to 820 nanometers, and (b) one or more pulses that comprise frequency components within a second frequency range that corresponds to a second wavelength range of 280 to 285 nanometers.

29. The foreign particle detection system according to claim 25 wherein the transmitted pulses comprise (a) one or more pulses that comprise frequency components within a first frequency range that corresponds to a first wavelength range of 750 to 820 nanometers, and (b) one or more pulses that comprise frequency components within a third frequency range that corresponds to a third wavelength range of 450 to 454 nanometers.

30. The foreign particle detection system according to claim 25 wherein the transmitted pulses comprise (a) one or more pulses that comprise frequency components within a first frequency range that corresponds to a first wavelength range of 750 to 820 nanometers, (b) one or more pulses that comprise frequency components within a second frequency range that corresponds to a second wavelength range of 280 to 285 nanometers and (c) one or more pulses that comprise frequency components within a third frequency range that corresponds to a third wavelength range of 450 to 454 nanometers.

31. The foreign particle detection system according to claim 25 wherein the transmitter is a unit that is mounted to a first end of the transparent pipe with analyzed liquid branch connection installed on the unit, the first end is located at the first side of the transparent pipe.

32. The foreign particle detection system according to claim 25 comprising a cleaning unit; wherein the controller is configured to trigger a cleaning of the liquid conduit based on the liquid contamination; and wherein the cleaning unit is configured to clean the liquid conduit with a cleaning solution.

33. The foreign particle detection system according to claim 25 wherein the fluid conduit has an inner layer that is at least partially transparent and an external layer that is reflective.

34. The foreign particle detection system according to claim 25 wherein the fluid conduit has an inner layer that is reflective.

35. The foreign particle detection system according to claim 25 wherein the liquid conduit is a transparent pipe and wherein the receiver and the transmitter are optically coupled to first and second sides of the transparent pipe, the first and second sides are opposite to each other.

36. The foreign particle detection system according to claim 25 that is configured to performing multiple iterations of liquid analysis for determining liquid contamination.

37. The foreign particle detection system according to claim 36 wherein the controller is configured to generate statistics that reflect the outcome of the multiple iterations.

38. The foreign particle detection system according to claim 36, wherein the controller is configured to select, before at least one iteration of the multiple iterations, and out of multiple liquid sampling points, a selected liquid sampling point for providing a liquid to be analyzed during the at least one iteration.

39. The foreign particle detection system according to claim 25 comprising a mixing unit that is configured to mix gas with an initial liquid to provide the liquid; and wherein the controller is configured to determine the contamination of the gas.

40. The foreign particle detection system according to claim 39 wherein the gas is air.

41. The foreign particle detection system according to claim 39 wherein the initial liquid is a liquid of a known composition.

42. The foreign particle detection system according to claim 39 wherein the bubble flask comprises a pump for pumping the air into an input conduit of the bubble flask, the bottom of the bubble flask is immersed within the liquid.

43. The foreign particle detection system according to claim 42 comprising a labyrinth that is configured to direct gas that exits the fluid towards an outlet of the bubble flask.

44. The foreign particle detection system according to claim 43 wherein the labyrinth prevents the air from propagating in a pure vertical path from the liquid to an air outlet of the bubble flask.

45. The foreign particle detection system according to claim 42 wherein the bubble flask has a non-flat bath that is filled with the liquid.

46. The foreign particle detection system according to claim 45 wherein the non-flat bath comprises at least one of indentations and boss arrangements.

47. The foreign particle detection system according to claim 25 wherein the length of the path exceeds the width of the liquid conduit by a factor of more than ten.

* * * * *